US012359801B1

(12) United States Patent
Ruan

(10) Patent No.: US 12,359,801 B1
(45) Date of Patent: Jul. 15, 2025

(54) LIGHT STRING WITH WATERPROOF STRUCTURE

(71) Applicant: Ningbo Maoli Electric Appliance Co., Ltd., Zhejiang (CN)

(72) Inventor: Lidan Ruan, Zhejiang (CN)

(73) Assignee: Ningbo Maoli Electric Appliance Co., Ltd., Ningbo (CN)

(*) Notice: Subject to any disclaimer, the term of this patent is extended or adjusted under 35 U.S.C. 154(b) by 0 days.

(21) Appl. No.: 18/959,722

(22) Filed: Nov. 26, 2024

(51) Int. Cl.
*F21V 31/00* (2006.01)
*F21S 4/10* (2016.01)
*F21V 21/002* (2006.01)
*F21V 21/008* (2006.01)
*F21V 23/06* (2006.01)

(52) U.S. Cl.
CPC .............. *F21V 31/005* (2013.01); *F21S 4/10* (2016.01); *F21V 21/002* (2013.01); *F21V 21/008* (2013.01); *F21V 23/06* (2013.01)

(58) Field of Classification Search
CPC ........ F21S 4/10; F21V 31/005; F21V 21/002; H01R 13/5213; H01R 13/5219
USPC .......................................................... 439/521
See application file for complete search history.

(56) References Cited

U.S. PATENT DOCUMENTS 6,079,848 A * 6/2000 Ahroni .................. H01R 4/242 439/699.1
11,384,907 B1 * 7/2022 Zou ...................... F21V 21/002
12,013,103 B1 6/2024 Liang
12,055,275 B1 8/2024 Zou
12,072,081 B1 8/2024 Martini
12,127,315 B2 10/2024 Yan et al.
2004/0150998 A1 * 8/2004 Fan .................... H01R 13/6456 362/267
2023/0034293 A1 * 2/2023 Wang .................... F21V 23/001
2024/0060637 A1 2/2024 Sawalski et al.
2024/0384842 A1 * 11/2024 Zou ........................... F21V 3/02

FOREIGN PATENT DOCUMENTS

TW M385115 U1 * 7/2010 ........... H01R 13/701

OTHER PUBLICATIONS

Machine translation of Cai, Wen-Qin, TW M385115U1, published Jul. 21, 2010 (Year: 2010).*

* cited by examiner

*Primary Examiner* — William N Harris
(74) *Attorney, Agent, or Firm* — S.J. Intellectual Property LTD.

(57) ABSTRACT

A light string with a waterproof structure includes a main cable, a connector and a light assembly. The connector includes a first plug handle, a second plug handle and a first waterproof cap. The first plug handle is provided with a plug, the first plug handle is provided with a first outer edge, and the second plug handle is provided with a socket. The first waterproof cap and the second plug handle can be selectively fastened and connected so that a first end of the first plug handle is tightly fitted with a first end of the second plug handle.

16 Claims, 19 Drawing Sheets

LIGHT STRING WITH WATERPROOF STRUCTURE

TECHNICAL FIELD

The present disclosure relates to a light string with waterproof structure.

BACKGROUND

String lights can be used in various settings. Besides providing illumination, they can also create different atmospheres through lighting effects.

SUMMARY

The embodiments of the present disclosure provide a light string with a waterproof structure, including: a cable, electrically connected to a plurality of light assemblies and a connector. The connector includes: a first plug handle having a first end arranged with a plug, an outer wall of the first plug handle provided with a first outer edge extending along a circumferential direction thereof, and the plug being electrically connected to a first end of the cable inside the first plug handle; a second plug handle having a first end arranged with a socket, the socket being electrically connected to a second end of the cable inside the second plug handle; and a first waterproof cap, sleeved outside of the first plug handle, an aperture of a second end of the first waterproof cap being smaller than an outer diameter of the first outer edge to allow the second end of the first waterproof cap to be restricted by the first outer edge to a side of the first plug handle. The first end of the first waterproof cap is capable of being fastened to a second plug handle to allow the first end of the first plug handle to be tightly fitted with the first end of the second plug handle and an inner wall of the second end of the first waterproof cap to be tightly fitted with an outer wall of the first outer edge.

BRIEF DESCRIPTION OF THE DRAWINGS

The description and drawings that constitute a part of the present disclosure are provided for a further understanding of the present disclosure. The illustrative embodiments and their descriptions are provided for explanation but do not constitute improper limitations on the present disclosure.

DETAILED WAY

Figure 1:
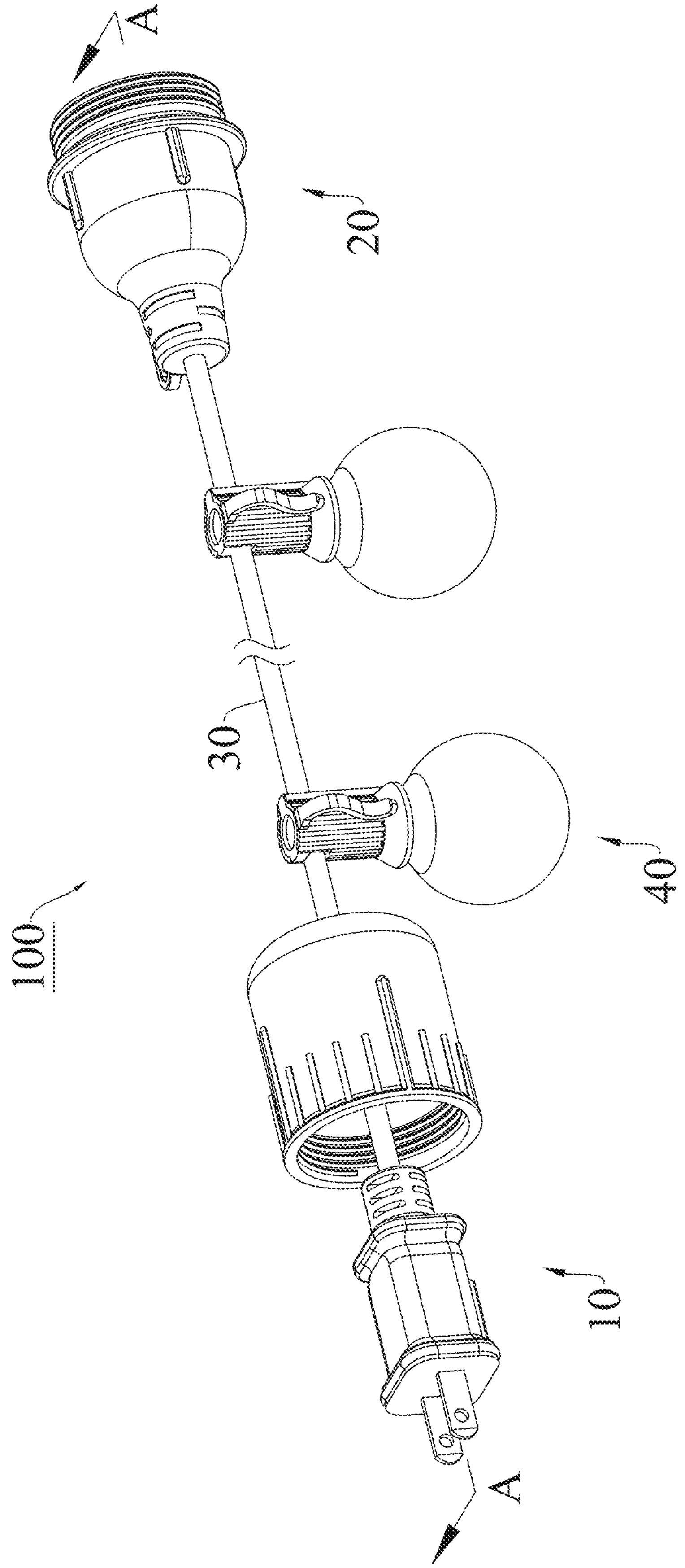
FIG. 1 is a perspective view of a light string in accordance with the embodiments of the present disclosure.

The present disclosure may be described in detail below with reference to the accompanying drawings and in conjunction with various embodiments. Each example is provided to explain but not limit the present disclosure. In fact, it may be clear to those of ordinary skill that modifications and variations may be made without departing from the scope or spirit of the present disclosure. For example, a feature shown or described as part of one embodiment may be used according to another embodiment to produce yet another embodiment. Therefore, it is intended that the present disclosure includes such modifications and variations within the scope of the appended claims and their equivalents.

In the description of the present disclosure, the terms “longitudinal”, “lateral”, “upper”, “lower”, “front”, “back”, “left”, “right”, “vertical”, “horizontal”, “top”, “bottom” and the like indicate the orientational or positional relationship based on the orientational or positional relationship illustrated in the drawings, which is only for the convenience of describing and does not require the present disclosure to be constructed and operated in a specific orientation, and therefore cannot be understood as limiting the present disclosure. The terms “connected”, “connecting” and “arranged” used in the present disclosure should be understood in a broad sense. For example, it may be a fixed connection or a detachable connection; it may be directly connected or indirectly connected through an intermediate component; it may also be a wired electrical connection, a radio connection, or a wireless signal connection. For those of ordinary skill in the art, the specific meanings of the above terms may be understood according to the specific circumstances.

One or more examples of the present disclosure are illustrated in the attached drawings. Numbers and letter signs are used in the detailed description to refer to features in the drawings. Similar signs in the drawings and descriptions have been configured to refer to similar parts of the present disclosure. As used herein, the terms "first", "second" and "third" are used interchangeably to distinguish one component from another and are not intended to indicate the position or importance of individual components.

Figure 2:
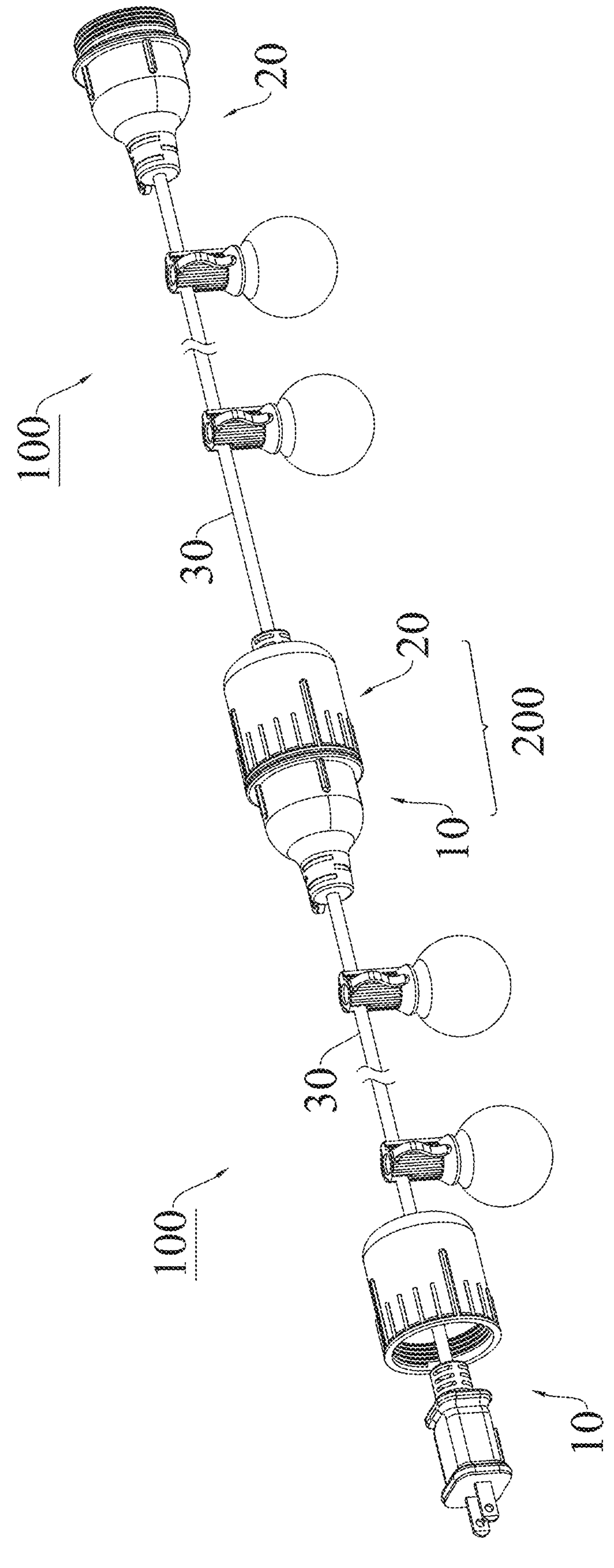
FIG. 2 is a perspective view of two light strings connected.

As shown in FIG. 1 and FIG. 2, a light string 100 with a waterproof structure includes a main cable 30, and a plurality of light assemblies 40 are arranged on the main cable 30. Two light strings 100 are electrically connected through a connector 200 with a waterproof function. The connector 200 includes a first interface 10 and a second interface 20 that can be detached from or engaged with each other.

Figure 3:
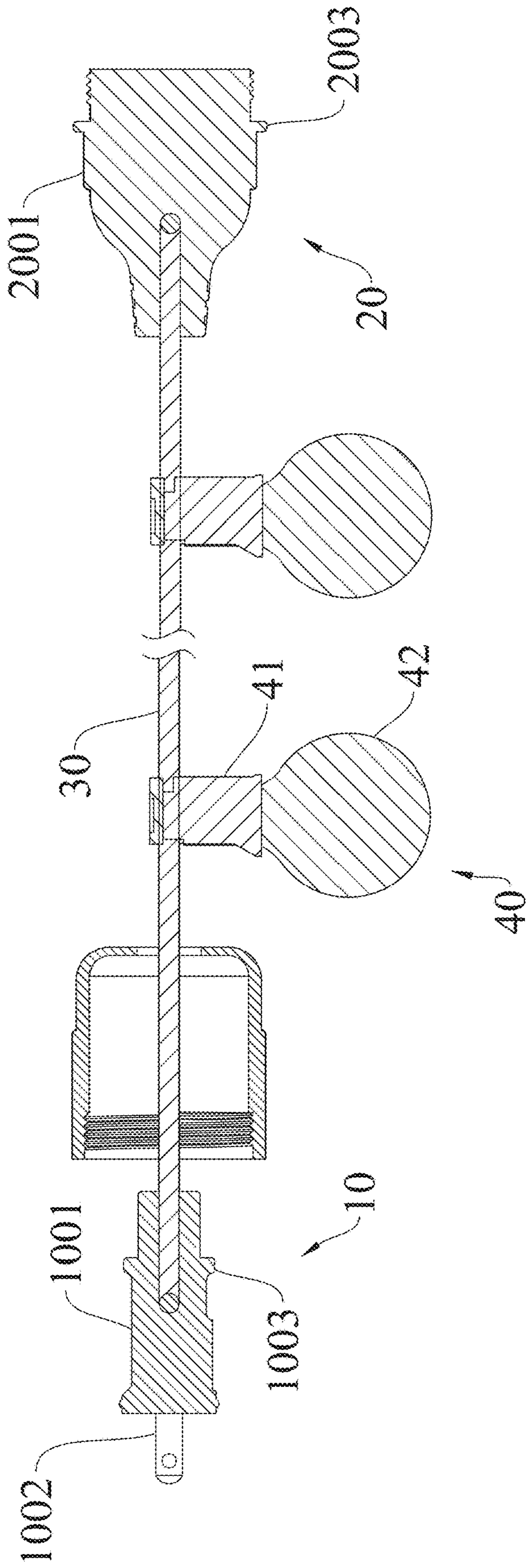
FIG. 3 is a sectional view taken along line AA in FIG. 1.

As shown in FIG. 1 and FIG. 3, the first interface 10 includes a first plug handle 1001, a first end of the first plug handle 1001 is arranged with a plug 1002 protruding outward along an axis of the first plug handle 1001, and the plug 1002 includes a first electrical connector. A second end of the first plug handle 1001 is connected with the main cable 30, and the first electrical connector and the main cable 30 are electrically connected inside the first plug handle 1001.

In some embodiments, the first electrical connector can directly constitute the plug 1002. Alternatively, the plug 1002 includes a protruding structure and a first electrical connector, and the first electrical connector is arranged outside the protruding structure.

In some embodiments, the junction of the first electrical connector and the main cable 30 is encapsulated inside the first plug handle 1001 by means of injection molding, achieving waterproofing of the connector 200.

The second interface 20 includes a second plug handle 2001, a first end of the second plug handle 2001 is defined with a socket 2002 recessing inward along an axis of the second plug handle 2001, and the socket 2002 is provided with a second electrical connector. A second end of the second plug handle 2001 is connected with a main cable 30. The second electrical connector and the main cable 30 are electrically connected inside the second plug handle 2001.

In some embodiments, the junction between the second electrical connector and the main cable 30 is encapsulated inside the second plug handle 2001 by means of injection molding, achieving waterproofing of the connector 200.

The connector 200 also includes a first waterproof cap 1008 configured to realize the selective engagement or disengagement of the first interface 10 and the second interface 20. As shown in FIG. 1 and FIG. 2, in some embodiments, the first waterproof cap 1008 is sleeved outside the first plug handle 1001, and a first end of the first waterproof cap 1008 faces the plug 1002. An inner wall of the first end of the first waterproof cap 1008 is provided with an internal thread. The first plug handle 1001 is provided with a first outer edge 1003 radially extending outward. Alternatively, the first outer edge 1003 is configured as a ring extending along a circumferential direction of the first plug handle 1001. An aperture of a second end of the first waterproof cap 1008 is smaller than an outer diameter of the first outer edge 1003, restricting the second end of the first waterproof cap 1008 to one side facing the main cable 30 of the first plug handle 1001, and preventing the first waterproof cap 1008 from disengaged from the first plug handle 1001. An outer wall of the first end of the second plug handle 2001 is provided with an external thread that is capable of engaging with the internal thread of the first waterproof cap 1008.

Figure 4:
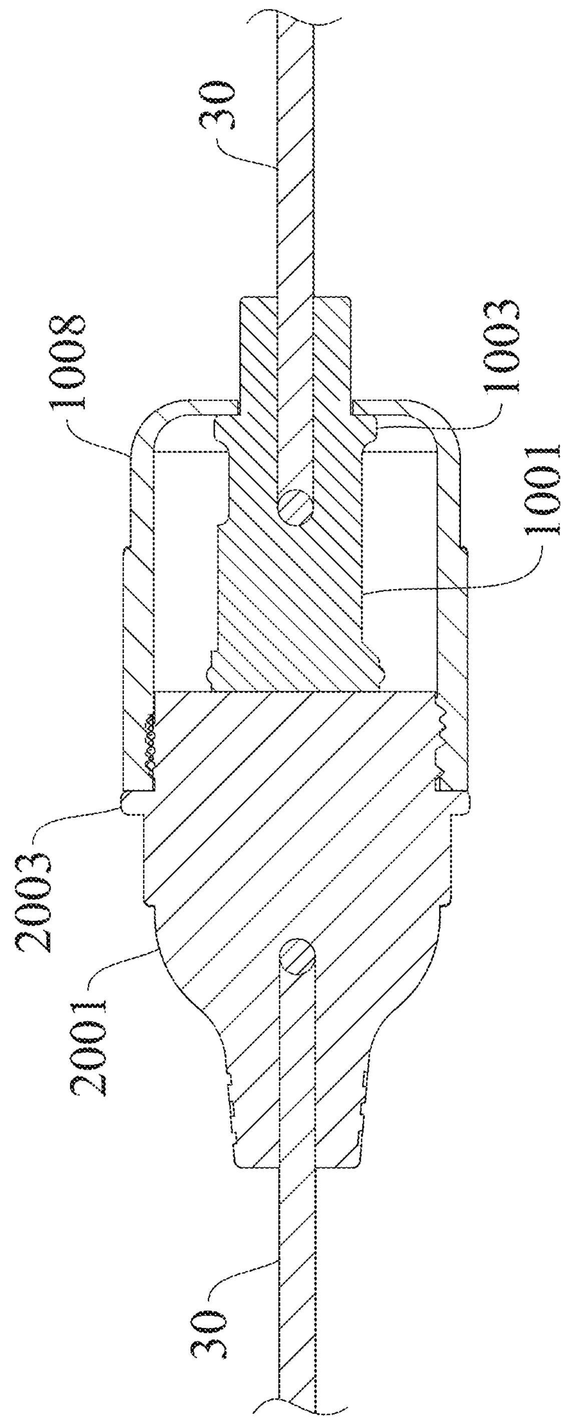
FIG. 4 is a sectional view of a connector in the combined state in accordance with the embodiments of the present disclosure.

As shown in FIG. 4, in some embodiments, when the first interface 10 is connected with the second interface 20, the plug 1002 of the first interface 10 is capable of being inserted into the socket 2002 of the second interface 20, and the electrical connection between the first interface 10 and the second interface 20 is realized through the engagement between the first electrical connector and the second electrical connector. Through the threaded connection between the first waterproof cap 1008 and the second plug handle 2001, an end surface of the first end of the first plug handle 1001 and an end surface of the first end of the second plug handle 2001 can be tightly fitted, and the first outer edge 1003 and the inner wall of the second end of the first waterproof cap 1008 can be tightly fitted, achieving the waterproofing of the connector 200.

Figure 5:
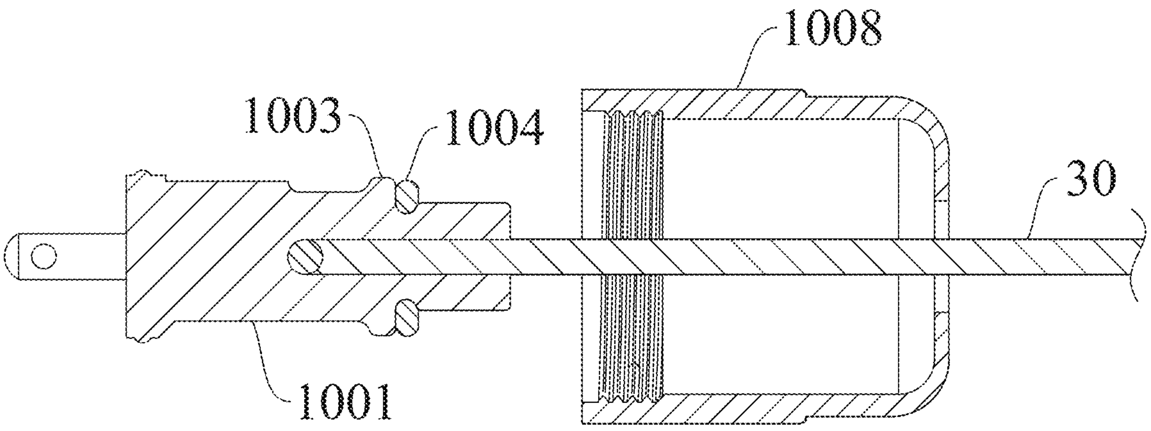
FIG. 5 is a sectional view of the first interface in FIG. 3.
Figure 6:
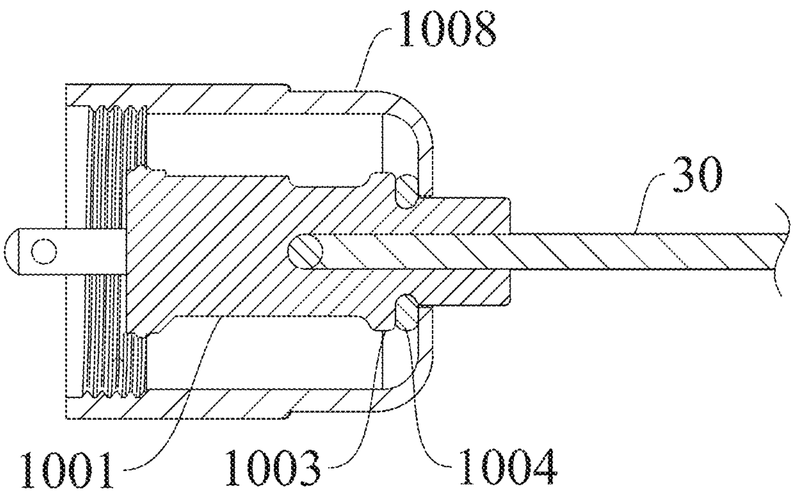
FIG. 6 is another sectional view of the first interface in FIG. 5.

As shown in FIG. 5 and FIG. 6, in some embodiments, the first plug handle 1001 is provided with a first gasket 1004, and the first gasket 1004 is arranged between the second end of the first waterproof cap 1008 and the first outer edge 1003. After the first waterproof cap 1008 is threadedly connected and fastened to the second plug handle 2001, the first gasket 1004 improves the waterproof performance between the first waterproof cap 1008 and the first outer edge 1003. The first gasket 1004 includes a waterproofing rubber ring.

Figure 7:
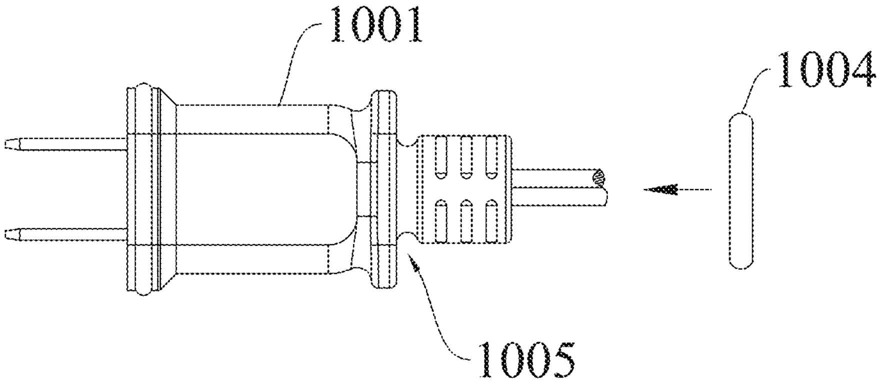
FIG. 7 is a schematic view of a first interface in accordance with the embodiments of the present disclosure.

As shown in FIG. 5 and FIG. 7, in some embodiments, the first plug handle 1001 is defined with a first annular slot 1005, and the first annular slot 1005 is arranged on a side proximal to the first outer edge 1003 and facing the main cable 30. At least a portion of the first gasket 1004 is embedded in the first annular slot 1005, allowing the first gasket 1004 to be restricted on the first plug handle 1001. In some embodiments, the first annular slot 1005 includes an annular slot extending along a circumferential direction of the first plug handle 1001.

As shown in FIG. 1 and FIG. 4, in some embodiments, the second plug handle 2001 is provided with a second outer edge 2003 radially extending outward, and the second outer edge 2003 is in the form of a ring extending along a circumferential direction of the second plug handle 2001. After the first waterproof cap 1008 is threadedly connected and fastened to the second plug handle 2001, an end surface of the first end of the first waterproof cap 1008 and the second outer edge 2003 abut against each other and fit tightly to improve the waterproofness of the second end of the second plug handle 2001.

Figure 11:
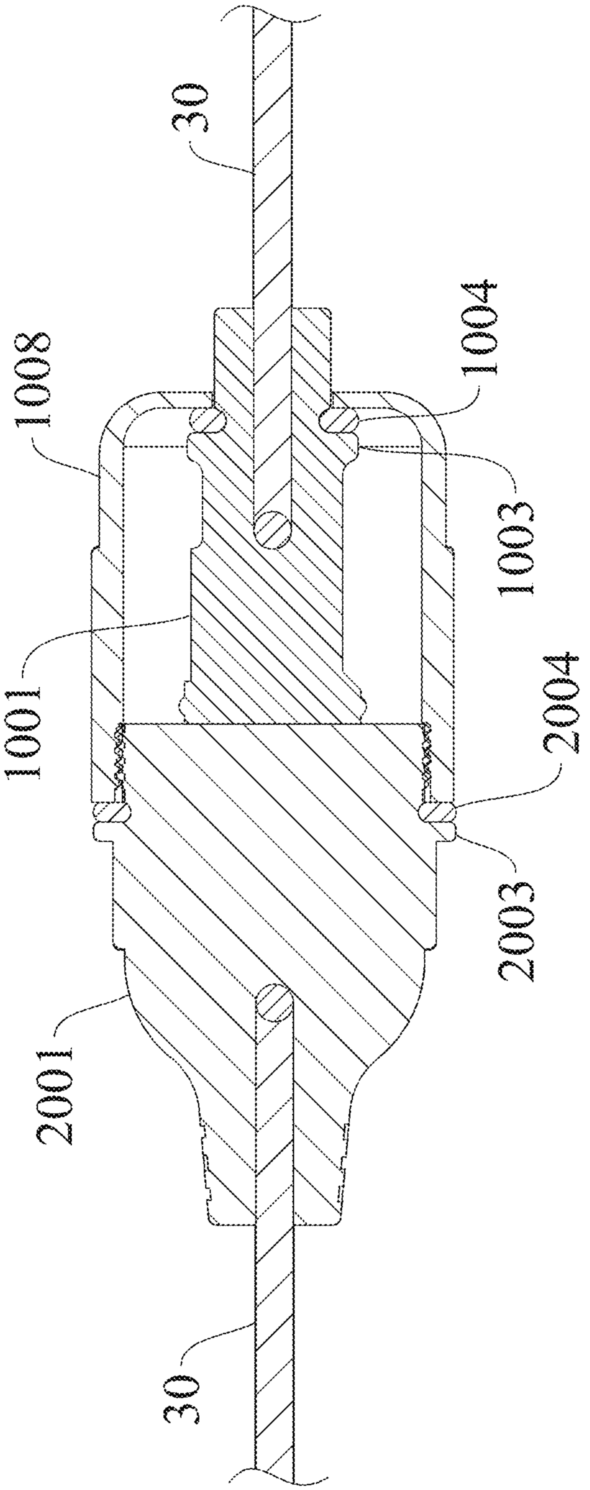
FIG. 11 is a schematic view of a connector in a combined state in accordance with the embodiments of the present disclosure.

As shown in FIG. 11, in some embodiments, the second plug handle 2001 is provided with a second gasket 2004, and the second gasket 2004 is arranged between the first end of the first waterproof cap 1008 and the second outer edge 2003. When the first waterproof cap 1008 is threadedly connected and fastened to the second plug handle 2001, the second gasket 2004 improves the waterproof performance between the first waterproof cap 1008 and the second outer edge 2003. The second gasket 2004 includes a waterproofing rubber ring.

Figure 8:
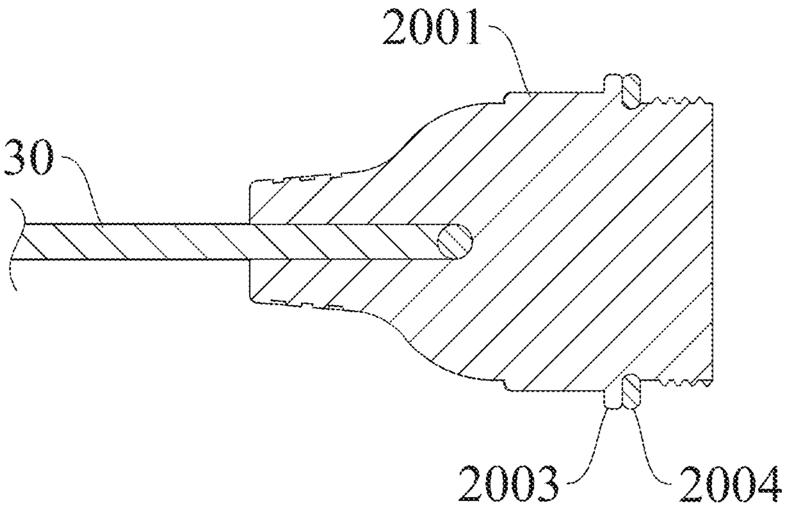
FIG. 8 is a sectional view of the second interface in FIG. 3.
Figure 9:
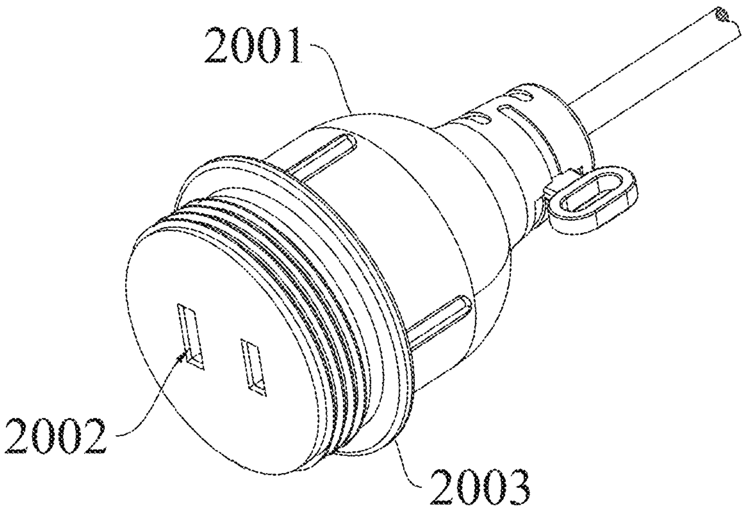
FIG. 9 is a perspective view of a second interface in accordance with the embodiments of the present disclosure.
Figure 10:
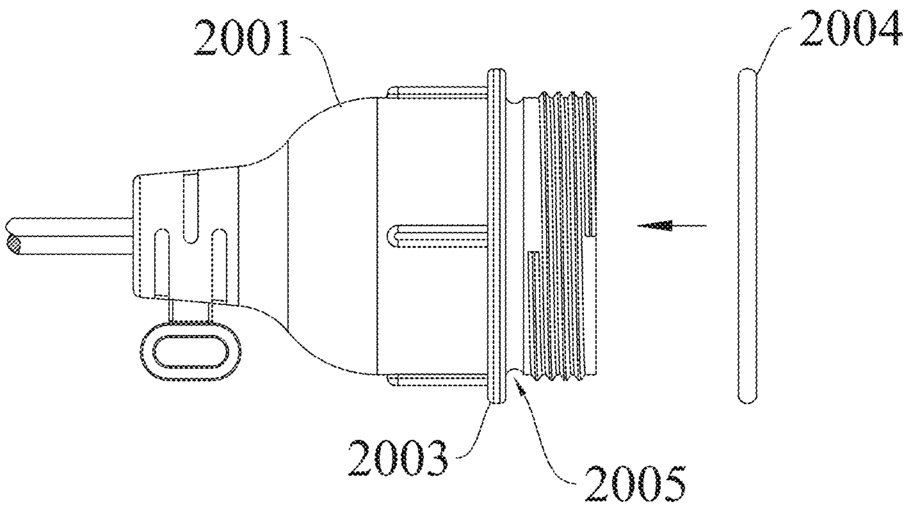
FIG. 10 is a schematic view of a second interface in accordance with the embodiments of the present disclosure.

As shown in FIG. 8 and FIG. 10, in some embodiments, the second plug handle 2001 is provided with a second annular slot 2005, and the second annular slot 2005 is arranged on a side proximal to the second outer edge 2003 and facing away from the main cable 30. At least a portion of the second gasket 2004 is embedded in the second annular slot 2005, restricting the second gasket 2004 on the second plug handle 2001. In some embodiments, the second annular slot 2005 includes an annular slot extending along a circumferential direction of the second plug handle 2001.

Figure 12:
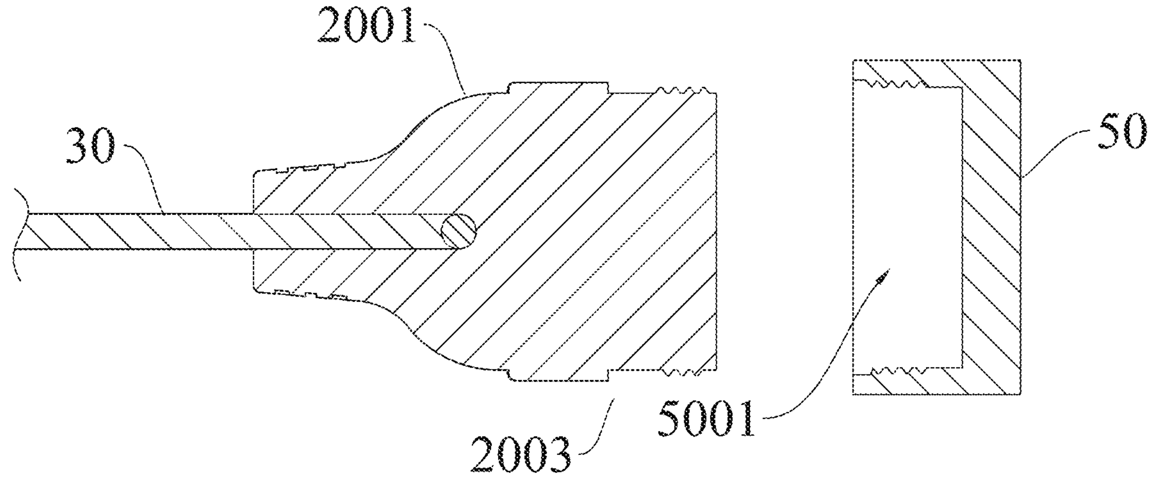
FIG. 12 is a schematic view of a second interface installed with a second waterproof cap in accordance with the embodiments of the present disclosure.

As shown in FIG. 2, in some application scenarios, the first end of the light string 100 is provided with a first interface 10, and the second end of the light string 100 is provided with a second interface 20. The first interface 10 is connected to a power supply end, and the second interface 20 can be selectively connected to the first interface 10 of another light string 100. However, when the second interface 20 is the end of the light string 100, it needs to be sealed to prevent water ingress and electrical leakage. Therefore, as shown in FIG. 12, in some embodiments, the connector 200 of the present disclosure also includes a second waterproof cap 50, and the second interface 20 at the end of the light string 100 is sealed by the second waterproof cap 50. The second waterproof cap 50 is defined with a blind hole 5001, and an inner wall of the blind hole 5001 is provided with an internal thread capable of engaging with the external thread of the second plug handle 2001. After the second waterproof cap 50 is threaded to the second plug handle 2001, a bottom surface of the blind hole 5001 of the second waterproof cap 50 and an end surface of the first end of the second plug handle 2001 are abutted against each other and tightly fitted, achieving waterproofing of the second plug handle 2001.

Figure 13:
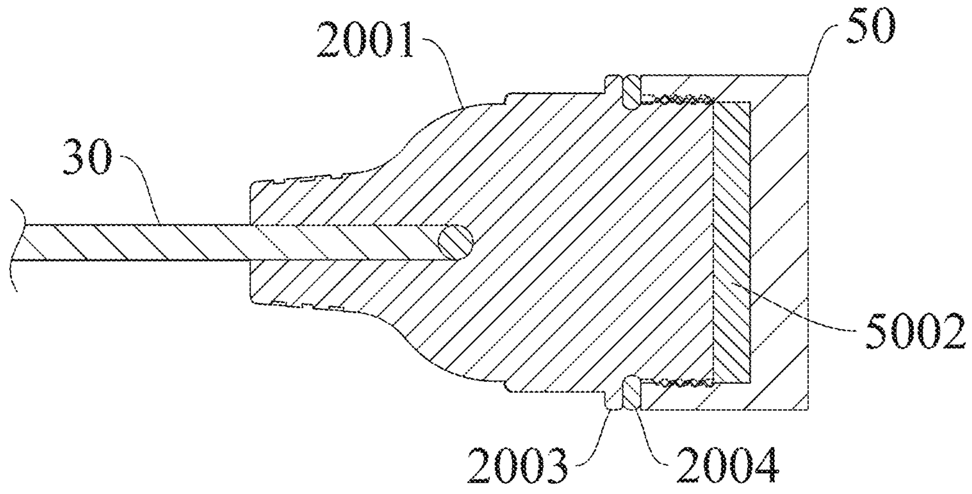
FIG. 13 is a perspective view of the second waterproof cap provided with a gasket in FIG. 12.

As shown in FIG. 13, in some embodiments, a gasket 5002 is provided at a bottom of the blind hole 5001 to further improve the waterproofing between the second waterproof cap 50 and the second plug handle 2001. The gasket 5002 includes a waterproof rubber pad.

Figure 14:
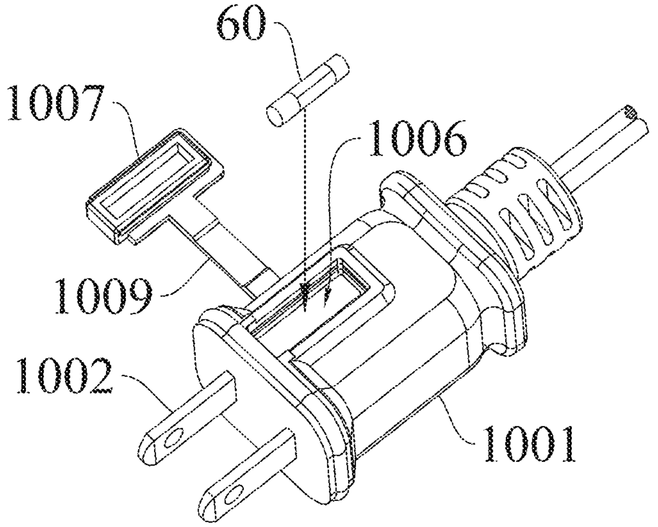
FIG. 14 is a perspective view of the first interface provided with a fuse, a slot and a slot cover in accordance with the embodiments of the present disclosure.
Figure 15:
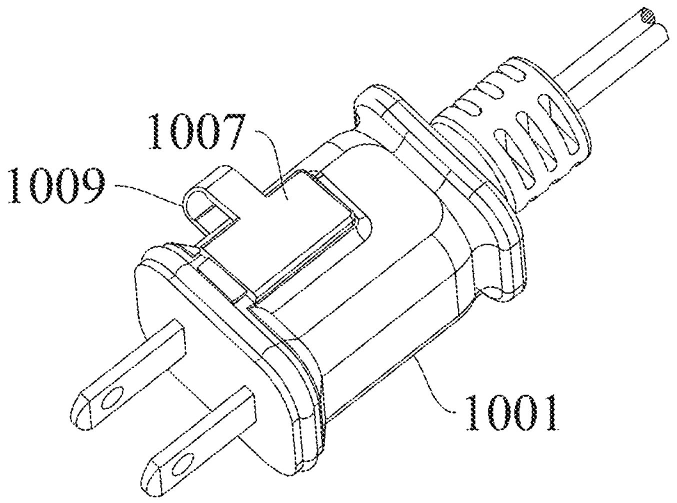
FIG. 15 is another perspective view of the first interface in FIG. 14.
Figure 16:
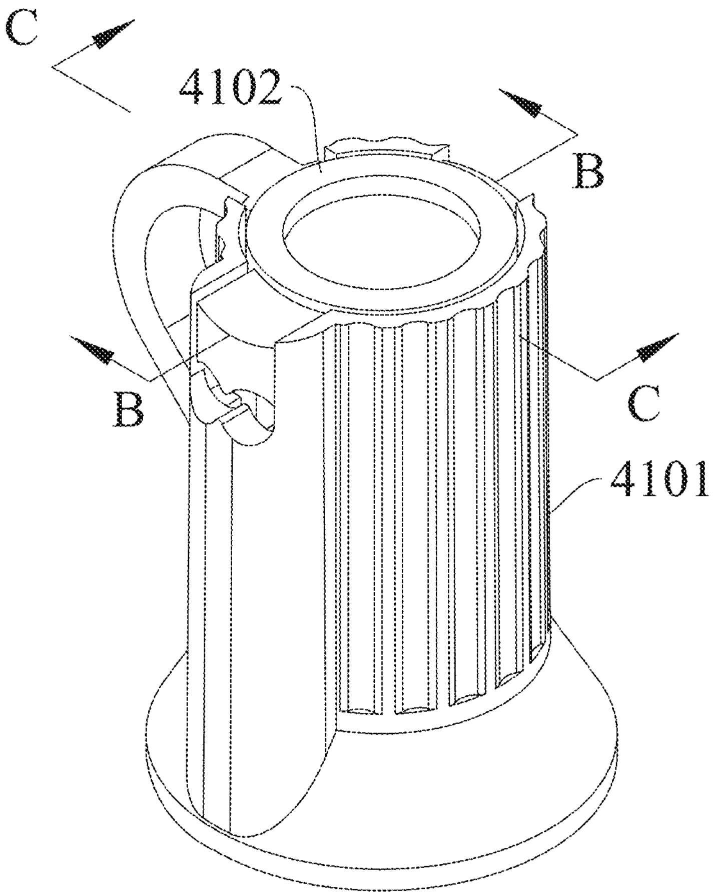
FIG. 16 is a perspective view of a lamp assembly in accordance with the embodiments of the present disclosure.

As shown in FIG. 14 and FIG. 15, during use, if a short circuit occurs at a power output end, the power supply device, the main cable 30 of the light string 100 and the connector 200 may be burned in serious cases. Therefore, in some embodiments, the connector 200 further includes a fuse 60, which can be selectively arranged on the first interface 10 or/and the second interface 20. A first end of the fuse 60 is electrically connected to one of the poles of the main cable 30, and a second end of the fuse 60 is electrically connected to one of the poles of the first electrical connector or one of the poles of the second electrical connector.

In some embodiments, the first plug handle 1001 is defined with a slot 1006, the fuse 60 is installed in the slot 1006. The first end of the fuse 60 is electrically connected to one of the poles of the main cable 30, and the second end of the fuse 60 is electrically connected to one of the poles of the first electrical connector.

In some embodiments, the slot 1006 is provided between the first end of the first plug handle 1001 and the first outer edge 1003. When the first interface 10 and the second interface 20 are tightly engaged by the first waterproof cap 1008, the slot 1006 is sealed by the first waterproof cap 1008, preventing the first plug handle 1001 from damaging the fuse 60 in the slot 1006 when bumped; or, avoiding as much as possible the risk of electric leakage or shock due to exposing of the fuse 60 and other electrical junctions.

In some embodiments, the slot 1006 is installed with a slot cover 1007, the slot cover 1007 includes an embeddable body, the embeddable body can be selectively inserted into the slot 1006, and an outer wall of the embeddable body is provided with a convex ring. When the slot cover 1007 is engaged with the slot, the convex ring is engaged with the slot 1006, restricting the slot cover 1007 in the slot and facilitates waterproof.

As the slot cover 1007 is small in size, although not often opened, it may be lost when checking or replacing the fuse 60. Therefore, in some embodiments, the slot cover 1007 can be connected to the first plug handle 1001 by a connecting belt 1009. The connecting belt 1009 includes at least one of a belt structure, a chain structure, and a wire structure.

As shown in FIG. 1, the lamp assembly 40 includes at least a lamp holder 41 and a bulb 42, the bulb 42 is electrically connected to an electrical connector of the lamp holder 41, and the main cable 30 is electrically connected to the electrical connector of the lamp holder 41.

As shown in FIG. 16 to FIG. 20, in some embodiments, the lamp holder 41 includes a housing 4101 and a top cover 4102 mounted on the housing 4101. A first end of the housing 4101 is defined with an inner cavity 4100, and an inner wall of the inner cavity 4100 is provided with an internal thread 4107, which can be engaged with the bulb 42. A second end of the housing 4101 is provided with a cavity bottom 4103. The housing 4101 is defined with a first slot 4109 and a second slot 4110 extending along an axis of the housing 4101. A portion of the first slot 4109 is opened on the inner wall of the inner cavity 4100, and the first slot 4109 is provided with a detachable first electrical connector 4105. A portion of the first electrical connector 4105 extends into the inner cavity 4100 and is electrically connected to a first electrode of the bulb 42. A spike is provided at one end, facing the top cover 4102, of the first electrical connector 4105. The cavity bottom 4103 of the housing 4101 is defined with the second slot 4110, which is provided with a detachable second electrical connector 4106. A portion of the second electrical connector 4106 extends into the inner cavity 4100 and is electrically connected to a second electrode of the bulb 42. A spike is provided at one end, facing the top cover 4102, of the second electrical connector 4106. The main cable 30 is placed between the top cover 4102 and the cavity bottom 4103 of the housing 4101. When the top cover 4102 is snapped on the housing 4101, the spike of the first electrical connector 4105 may pierce the outer layer of the main cable 30 and be electrically connected to a first wire of the main cable 30. The spike of the second electrical connector 4106 may pierce the outer layer of the main cable 30 and be electrically connected to a second wire of the main cable 30.

In some embodiments, the first electrical connector 4105 is provided with an elastic member, which is arranged in the inner cavity 4100. At least one end of the elastic member is electrically connected to the first electrical connection, and at least a portion of the elastic member protrudes toward a radial center of the inner cavity 4100, allowing at least a portion of the elastic member and the first electrode of the bulb 42 to be tightly abutted against each other.

In some embodiments, the second end of the housing 4101 is defined with an assembly hole 4108 extending in an axis of the housing 4101. One end, facing the housing 4101, of the top cover 4102 is provided with a hook 4104, which may engage with the assembly hole 4108, restricting the top cover 4102 on the housing 4101.

Figure 17:
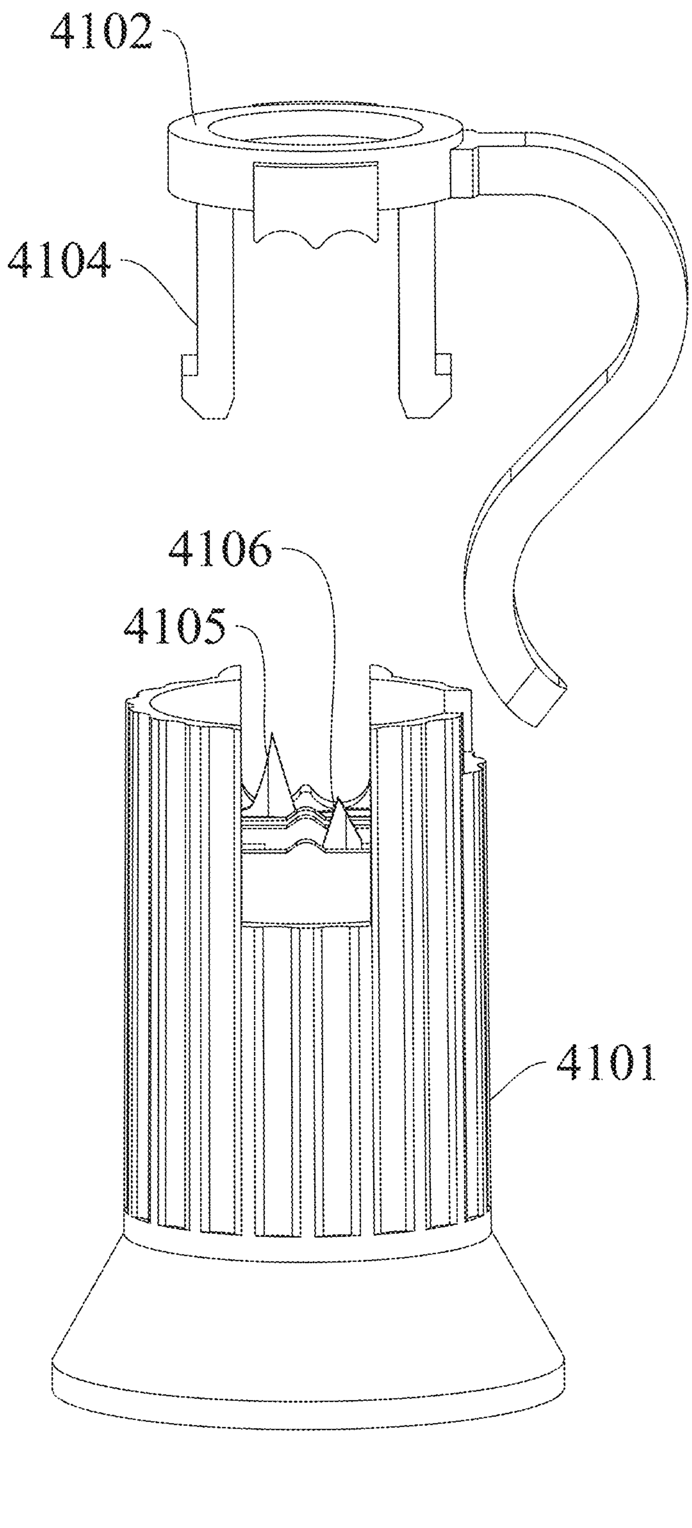
FIG. 17 is a perspective view of the top cover separated with the housing in FIG. 16.
Figure 18:
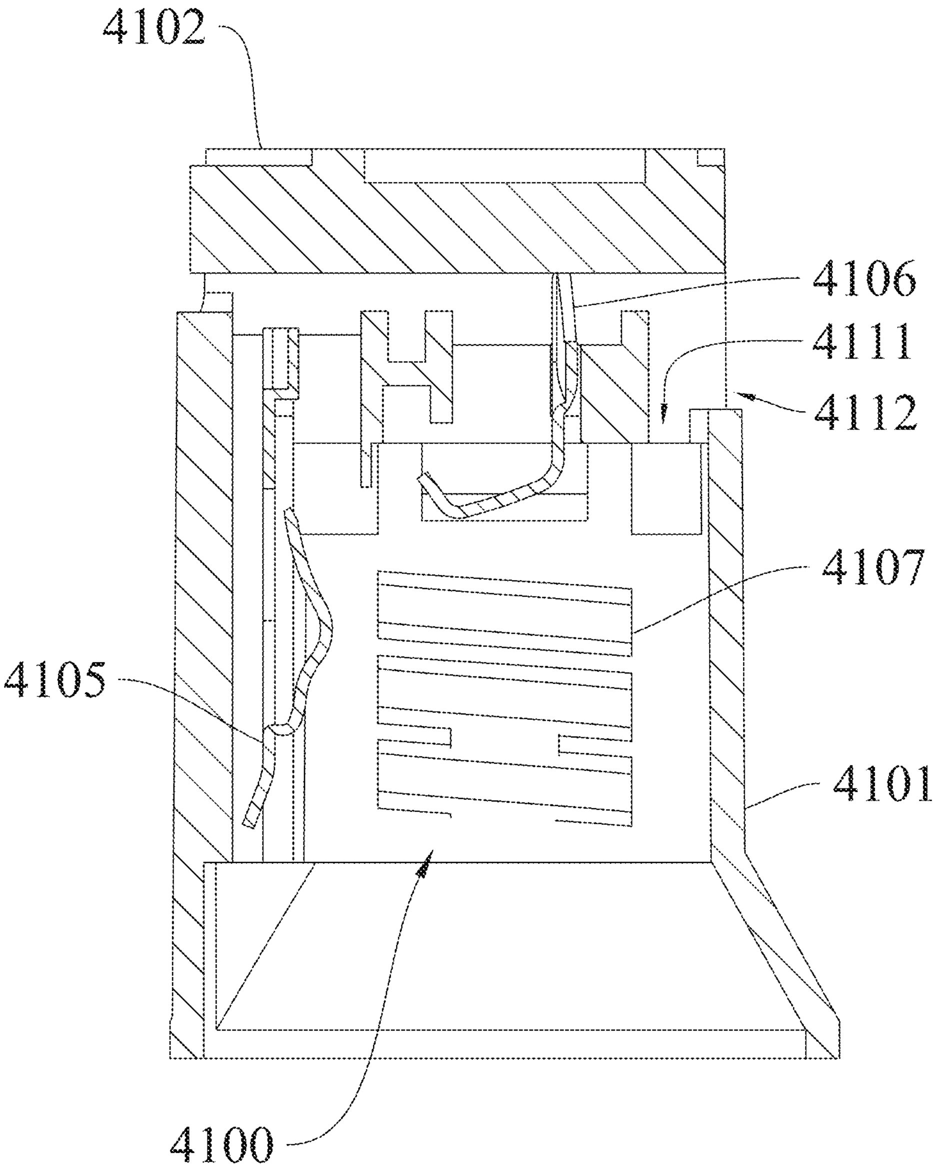
FIG. 18 is a sectional view taken along the line BB in FIG. 16.
Figure 19:
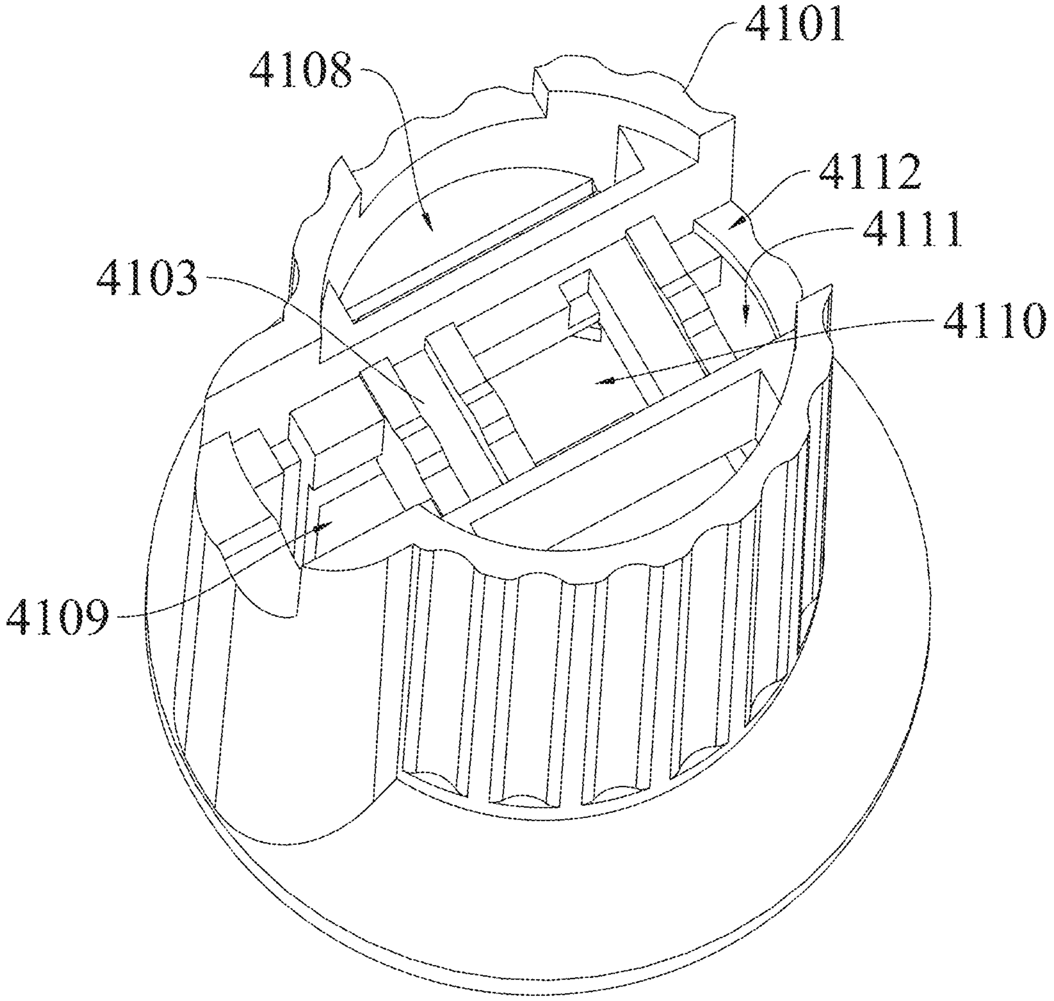
FIG. 19 is a top view of a housing in accordance with the embodiments of the present disclosure.
Figure 20:
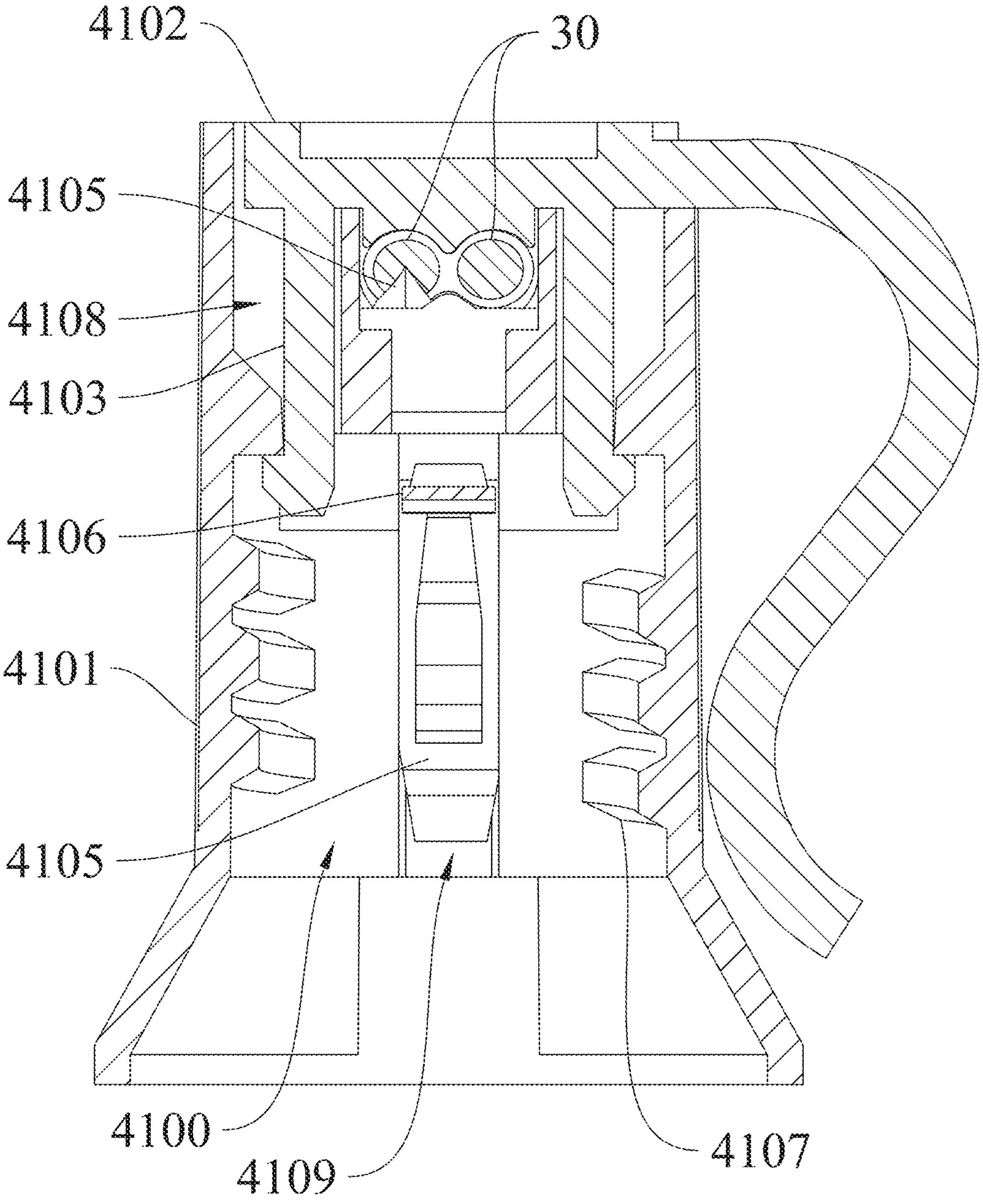
FIG. 20 is a sectional view taken along the line CC in FIG. 16.

As shown in FIG. 17 to FIG. 19, in some embodiments, the housing 4101 is provided with a first through hole 4111, the first end of which runs through the cavity bottom 4103, and the second end of which communicates with the inner cavity 4100. In some embodiments, the inner wall of the inner cavity 4100 is defined with a drainage slot, which is arranged along an axis of the inner cavity 4100. A first end of the drainage slot is in communication with a second end of the first through hole 4111. If water enters from the first end proximal to the top cover 4102, of the housing 4101, the water can be quickly discharged along the first through hole 4111, the inner cavity 4100, and the drainage slot.

Alternatively, in some cases, the bulb 42 needs to be placed upward and the lamp holder 41 needs to be placed downward. If water splashes onto the lamp assembly 40, the electrical connector in the lamp assembly 40 may be soaked in water for a long time. In order to quickly guide the water out, in some embodiments, the housing 4101 is defined with a second through hole 4112. The second through hole 4112 is provided at the first end of the housing 4101, and the second through hole 4112 is in communication with the first through hole 4111. When water enters the lamp assembly 40 from an end, proximal to the bulb, of the inner cavity 4100, the water can be quickly discharged along the inner wall of the inner cavity 4100, the above-mentioned drainage slot, the first through hole 4111 and the second through hole 4112.

Figure 21:
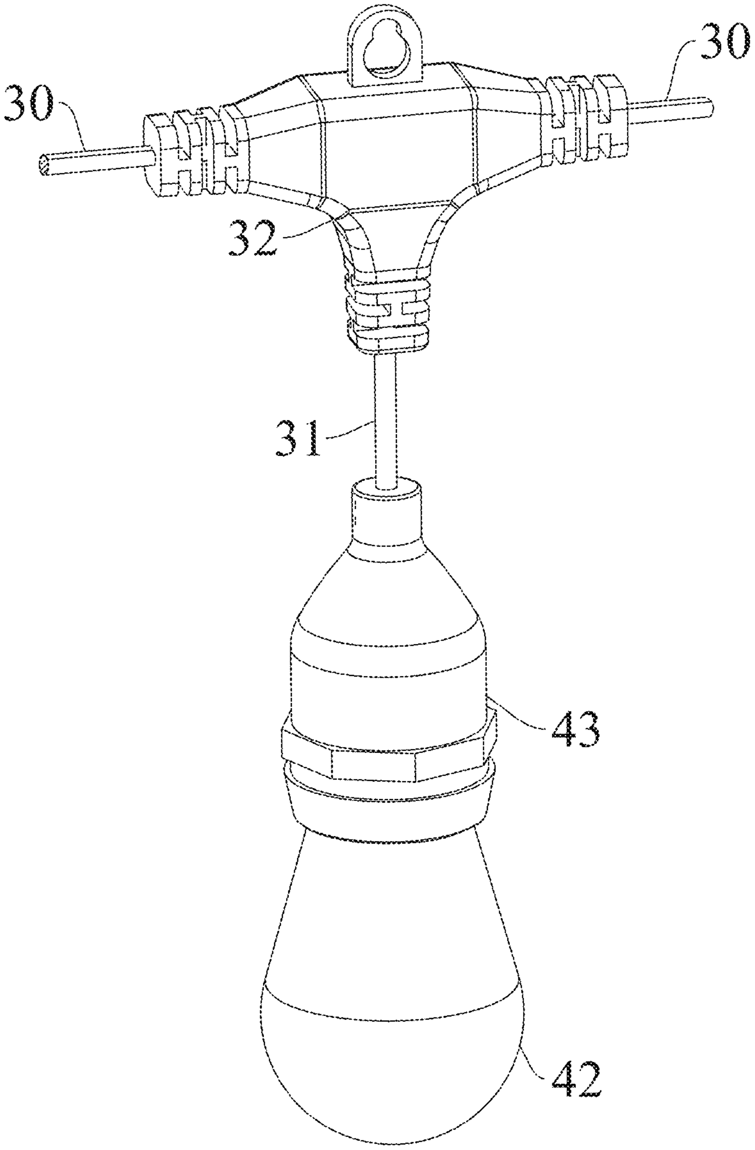
FIG. 21 is a perspective view of a lamp assembly in accordance with the embodiments of the present disclosure.

As shown in FIG. 21, the present disclosure provides a lamp assembly 40 including at least a lamp holder 43 and a bulb 42. The bulb 42 is electrically connected to an electrical connector in the lamp holder 41, and the main cable 30 is electrically connected to the electrical connector in the lamp holder 41.

In some embodiments, the main cable 30 can selectively be arranged with a branch cable 31, and a seal 32 is provided at an electrical junction between the main cable 30 and the branch cable 31, providing waterproof protection for the electrical connection therein and improving the tensile strength of the electrical junction. The main cable 30 is electrically connected to the electrical connector in the lamp holder 41 through the branch cable 31.

Figure 22:
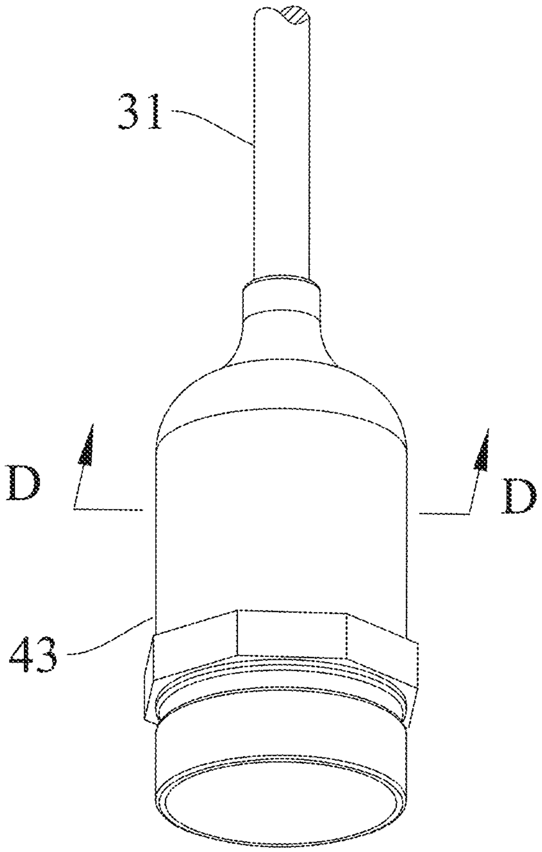
FIG. 22 is a perspective view of the lamp holder in FIG. 21.
Figure 23:
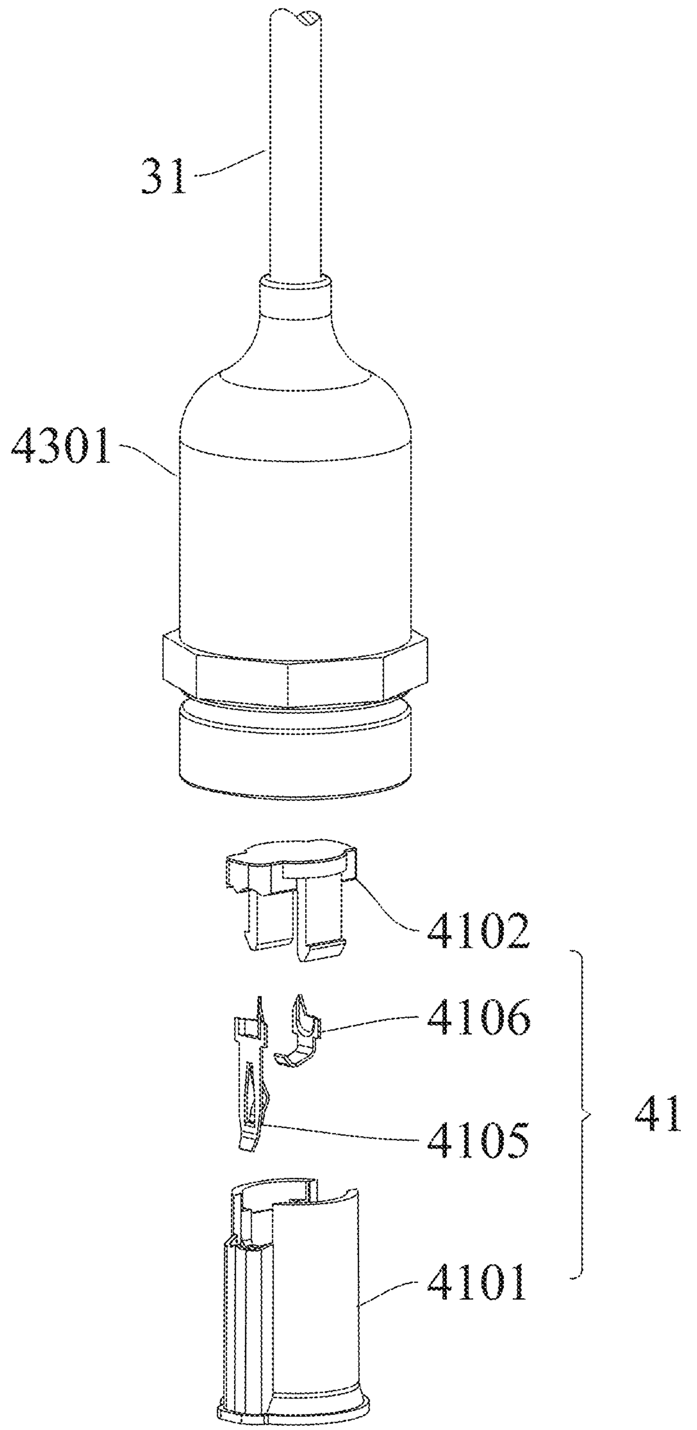
FIG. 23 is an exploded view of the lamp holder in FIG. 22.
Figure 24:
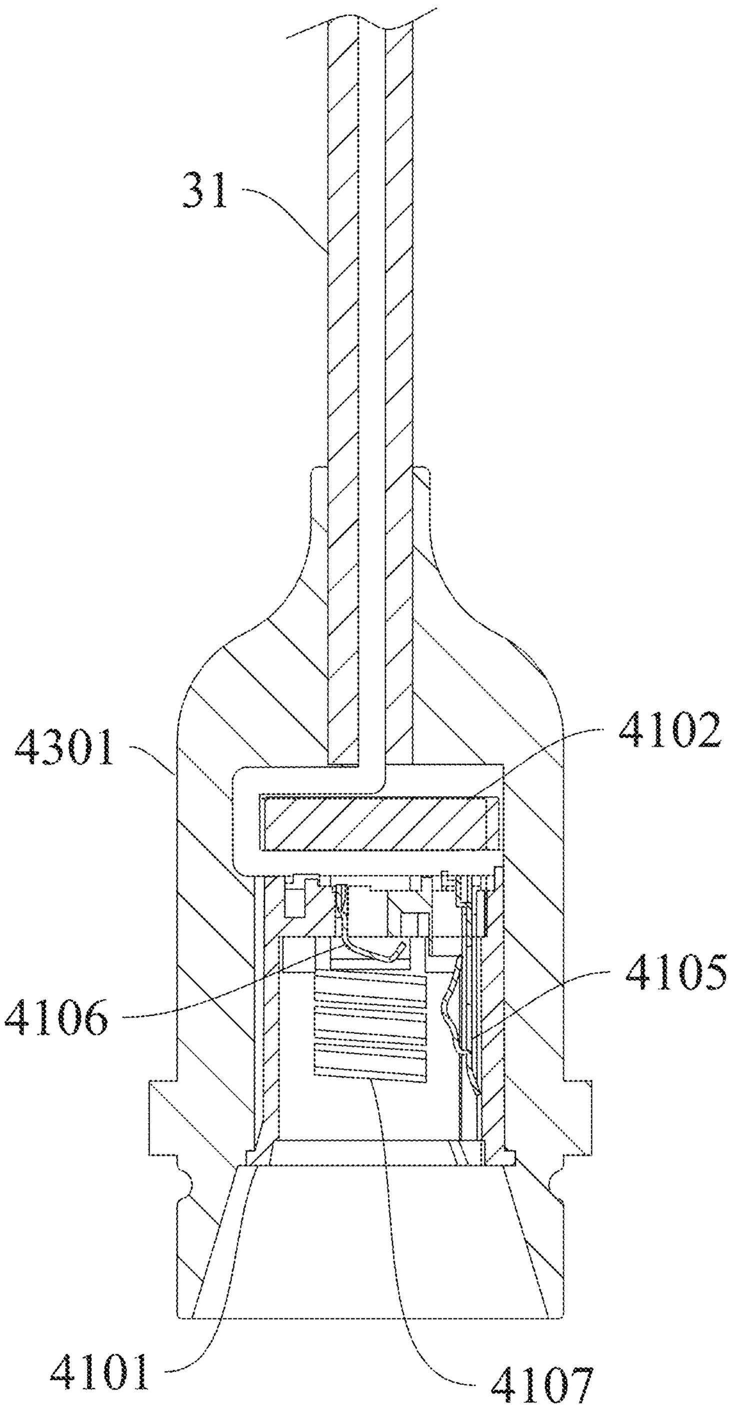
FIG. 24 is a sectional view taken along line DD in FIG. 22.

In some embodiments, the lamp holder 43 includes an outer casing 4301, and the bulb 41 in the above embodiment is provided in the outer casing 4301. As shown in FIG. 22 to FIG. 24 and with reference to FIG. 16 to FIG. 20, a housing 4101 and a top cover 4102 mounted on the housing 4101 are provided in the outer casing 4301. A first end of the housing 4101 is defined with an inner cavity 4100, and an inner wall of the inner cavity 4100 is defined with an inner thread 4107, which can be engaged with the bulb 42. A second end of the housing 4101 is defined with a cavity bottom 4103. The housing 4101 is defined with a first slot 4109 and a second slot 4110 extending along an axis of the housing 4101. A portion of the first slot 4109 is opened on the inner wall of the inner cavity 4100, and the first slot 4109 is provided with a detachable first electrical connector 4105, a portion of the first electrical connector 4105 extends into the inner cavity 4100 and is electrically connected to the first electrode of the bulb 42, and a spike is provided at one end of the first electrical connector 4105 facing the top cover 4102. The second slot 4110 is provided on the cavity bottom 4103 of the housing 4101, and the second slot 4110 is provided with a detachable second electrical connector 4106, a portion of the second electrical connector 4106 extends into the inner cavity 4100 and is electrically connected to the second electrode of the bulb 42, and a spike is provided at one end of the second electrical connector 4106 facing the top cover 4102. The branch cable 31 is placed between the top cover 4102 and the cavity bottom 4103 of the housing 4101. When the top cover 4102 is snapped on the housing 4101, the spike of the first electrical connector 4105 may pierce the outer layer of the branch cable 31 and be electrically connected to a first wire of the branch cable 31; the spike of the second electrical connector 4106 may pierce the outer layer of the branch cable 31 and be electrically connected to a second wire of the branch cable 31. The outer casing 4301 can provide effective waterproof protection for the electrical connectors therein.

The above description is only some embodiments of the present disclosure and is not intended to limit the present disclosure. For those of ordinary skill in the art, the present disclosure may have various modifications and variations. Any modification, equivalent replacement, improvement, etc. made within the spirit and principle of the present disclosure shall be included in the protection scope of the present disclosure.

What is claimed is:

1. A light string with a waterproof structure, comprising:

a cable, electrically connected to a plurality of light assemblies; and a connector, comprising:

a first plug handle, having a first end arranged with a plug, an outer wall of the first plug handle provided with a first outer edge extending along a circumferential direction thereof, and the plug being electrically connected to a first end of the cable inside the first plug handle;

a second plug handle, having a first end arranged with a socket, and the socket being electrically connected to a second end of the cable inside the second plug handle; and a first waterproof cap, sleeved outside of the first plug handle, an aperture of a second end of the first waterproof cap being smaller than an outer diameter of the first outer edge to allow the second end of the first waterproof cap to be restricted by the first outer edge to a side of the first plug handle; the first waterproof cap comprising an internal thread at an inner sidewall of the first waterproof cap;

the first plug handle is provided with a first gasket arranged between the second end of the first waterproof cap and the first outer edge;

the second plug handle comprises an external thread at an outer sidewall of the second plug handle; the second plug handle is provided with a second outer edge extending along a circumferential direction of the second plug handle; the second plug handle is provided with a second gasket located between the second outer edge and the external thread;

the internal thread of the first waterproof cap is configured to be threaded to the external thread of the second plug handle to allow the first end of the first plug handle to be fitted with the first end of the second plug handle, an inner wall of the second end of the first waterproof cap to be fitted with the first gasket, and an outer wall of the first end of the first waterproof cap to be fitted with the second gasket.

2. The light string according to claim 1, wherein the first plug handle is defined with a first annular slot, the first annular slot is located proximal to the first outer edge and faces the cable, and at least a portion of the first gasket is embedded in the first annular slot to allow the first gasket to be restricted on the first plug handle.

3. The light string according to claim 1, wherein the second plug handle is defined with a second annular slot, the second annular slot is located proximal to the second outer edge and faces away from the cable, and at least a portion of the second gasket is embedded in the second annular slot to allow the second gasket to be restricted on the second plug handle.

4. The light string according to claim 1, wherein the connector further comprises a second waterproof cap defined with a blind hole, and the second waterproof cap is capable of being threaded to the second plug handle to allow a bottom surface of the blind hole of the second waterproof cap to be tightly fitted with an end surface of the first end of the second plug handle.

5. The light string according to claim 1, wherein the connector further comprises a fuse arranged on the first plug handle or the second plug handle, and the fuse is electrically connected to the cable and the first plug handle or the second plug handle.

6. The light string according to claim 5,
wherein the first plug handle or the second plug handle is defined with a slot configured for installing the fuse.

7. The light string according to claim 6,
wherein the slot is located between the first end of the first plug handle and the first outer edge, and the first waterproof cap is threaded to the second plug handle to allow the slot to be sealed by the first waterproof cap.

8. The light string according to claim 6,
wherein the slot is installed with a slot cover, and the slot cover is configured to be snap-fitted with the slot.

9. The light string according to claim 8,
wherein the slot cover is connected to the first plug handle or the second plug handle through a connecting belt.

10. The light string according to claim 1,
wherein each of the plurality of light assemblies comprises a lamp holder and a bulb electrically connected, and the cable is electrically connected to an electrical connector in each lamp holder.

11. The light string according to claim 10,
wherein each lamp holder comprises:
a housing, having a first end defined with an inner cavity;
a top cover, detachably mounted on a second end of the housing;
a first electrical connector, a portion thereof extending into the inner cavity and electrically connected to a first electrode of the bulb, and one end of the first electrical connector being arranged with a spike; and
a second electrical connector, a portion thereof extending into the inner cavity and electrically connected to a second electrode of the bulb, and one end of the second electrical connector being arranged with a spike;
wherein the cable is restricted by the top cover on the second end of the housing, and the spike of the first electrical connector and the spike of the second electrical connector are capable of piercing an outer layer of the cable and being electrically connected to the cable.

12. The light string according to claim 11,
wherein the second end of the housing is defined with a bottom, a first slot and a second slot;
a portion of the first slot is provided on an inner wall of the inner cavity and communicates with the inner cavity, and the first electrical connector is detachably installed in the first slot; the second slot is provided on the bottom of the housing, and the second electrical connector is detachably installed in the second slot.

13. The light string according to claim 11,
wherein the first electrical connector is electrically connected with an elastic member, at least a portion of the elastic member is arranged in and protrudes toward the inner cavity to allow the at least a portion of the elastic member and the first electrode of the bulb to be tightly abutted against each other.

14. The light string according to claim 11,
wherein the second end of the housing is defined with an assembly hole; one end, facing the housing, of the top cover is provided with a hook configured to be engaged with the assembly hole.

15. The light string according to claim 11,
wherein each of the plurality of the light assemblies further comprises an outer casing, and the lamp holder is arranged in the outer casing.

16. The light string according to claim 11,
wherein the housing is defined with a first through hole running through the second end of the housing and in communication with the inner cavity; or
the housing is defined with a first through hole and a second through hole, the first through hole runs through the second end of the housing and is in communication with the inner cavity, the first end of the housing is defined with the second through hole, and the first through hole is in communication with an outside of the housing through the second through hole.

* * * * *